March 14, 1967 E. R. RUSSELL ETAL 3,309,323
THORIUM OXIDE OR THORIUM-URANIUM OXIDE WITH MAGNESIUM OXIDE
Filed Oct. 19, 1965
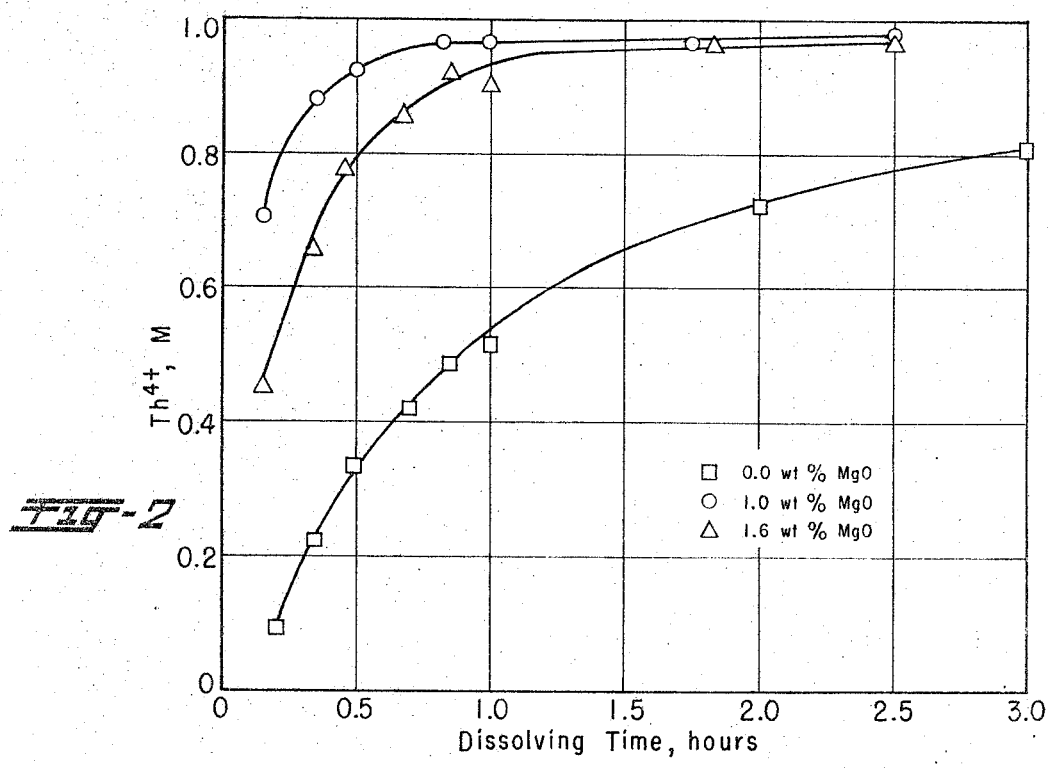
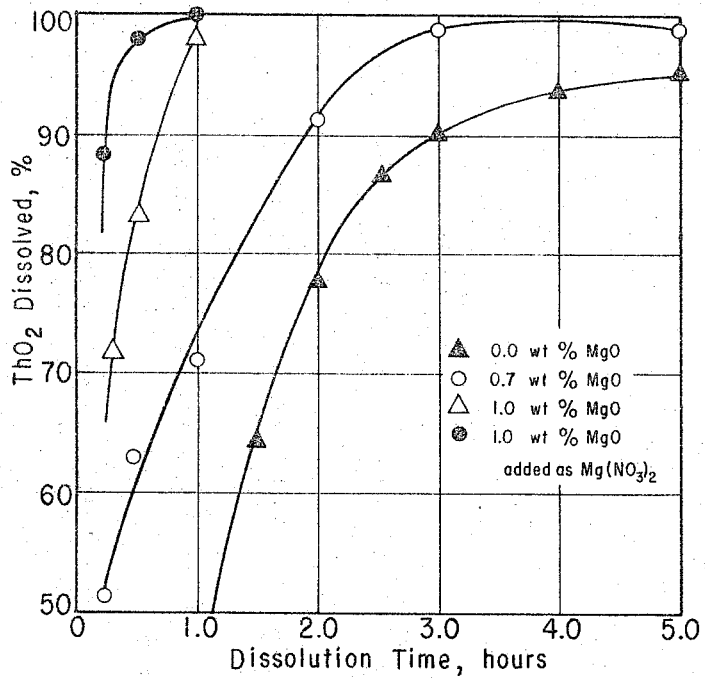
INVENTORS
EDWIN R. RUSSELL
WILLIAM E. PROUT
HAROLD J. GROH
GEORGE W. WATT
Attorney:

United States Patent Office 3,309,323
Patented Mar. 14, 1967

3,309,323
THORIUM OXIDE OR THORIUM-URANIUM
OXIDE WITH MAGNESIUM OXIDE
Edwin R. Russell, Columbia, and William E. Prout and Harold J. Groh, Aiken, S.C., and George W. Watt, Austin, Tex., assignors to the United States of America as represented by the United States Atomic Energy Commission
Filed Oct. 19, 1965, Ser. No. 498,172
3 Claims. (Cl. 252—301.1)

Our invention relates to an improved thorium oxide material and more particularly to thorium oxide and thorium-uranium oxide material having improved dissolution properties. Our invention also relates to a method for the preparation of this material.

Thorium is useful as a source of fissionable material, since thorium-232 is converted to fissionable uranium-233 by irradiation with thermal neutrons. Thorium is often employed in the form of high density thorium oxide and/or thorium-uranium oxide particles, contained in heterogeneous fuel for nuclear reactors. Irradiated thorium oxide fuel material, removed from the reactor, is then chemically processed for the separation and recovery of useful isotopes and for the decontamination of the irradiated thorium for recovery and reuse in reactors. Solvent extraction of aqueous solutions of thorium nitrate is the most economical and preferred chemical method of recovering the desired fissionable isotopes, such as uranium-233, produced in the thorium fuel and of decontaminating the irradiated thorium for reuse. To prepare the fuel material for this preferred solvent extraction process it must be dissolved in a mineral acid, usually nitric acid catalyzed with fluoride ion. However, high density thorium oxide (or thorium-uranium oxide) particles, particularly particles whose density exceeds 90% of theoretical, are very difficult to dissolve. The problems relating to the dissolution of thorium oxide are discussed further in the Reactor Handbook, volume 2, "Fuel Reprocessing," second edition, Interscience Publishers, New York, page 72.

The preferred method employed for the preparation of high density thorium oxide and thorium-uranium oxide particles is the process known in the art as the "sol-gel" process which is disclosed in U.S. Patent 3,035,895 issued to K. H. McCorkle, et al. on May 22, 1962, and assigned to the U.S. Atomic Energy Commission. Briefly, the steps in the sol-gel process include the preparation of a dispersible thorium oxide (activated thorium oxide) preferably by steam denitration of a thorium nitrate solution, the dispersion of the thoria in water or an aqueous nitrate system to produce a stable sol, the conversion of the sol to a gel by carefully controlled evaporation, and the calcination of the gel to produce thorium oxide particles having a high density. For the preparation of mixed thorium-uranium oxide having a uranium content of less than about 8 weight percent, uranium is added in nitrate form to the thorium nitrate solution. Details and critical parameters of the sol-gel process are disclosed in the specification of the above patent and in USAEC Report ORNL-3225, dated June 19, 1962. This process yields millimeter size oxide particles having densities in excess of 98% of theoretical and which are particularly suitable for fabrication into high-density heterogeneous fuels. Unfortunately, however, these high density particles are extremely difficult to dissolve, even using the most effective solvent for thorium oxide, viz., 13 M $HNO_3$–0.025 M HF–0.10 M $Al(NO_3)_3$. For instance, 26.4 gms. of "sol-gel" thorium-oxide, −16+20 mesh in 100 ml. of the above solvent was only 50% dissolved after one hour, only 90% dissolved after three hours, and not completely dissolved after five hours. Rapid dissolution of the irradiated thorium oxide is desirable to permit efficient and economical chemical processing in conventional process equipment.

It is therefore an object of our invention to provide an oxide nuclear reactor fuel material having improved dissolution properties.

Another object of our invention is to provide a thorium oxide material having improved dissolution properties.

Still another object of the present invention is to provide a method for the preparation of thorium oxide material having improved dissolution properties.

A further object is to provide an improvement in the process for the preparation of high density thorium oxide particle composition.

Other objects and advantages of our invention will be apparent to those skilled in the art from the following detailed description and appended claims. It should be noted that when the term thorium oxide is used herein, it is intended that this term embrace thorium oxide employed in combination with uranium oxide up to approximately 8 weight percent to provide both fuel and fertile material for use in nuclear reactors.

In accordance with our invention we have provided an oxide particle composition suitable for use as a nuclear fuel material consisting essentially of a major proportion of one oxide selected from the group consisting of thorium oxide and thorium-uranium oxide and a minor proportion of magnesium oxide. This oxide particle composition is prepared by adding a small quantity of magnesium oxide as a magnesium oxide slurry or a soluble magnesium salt to a sol of activated thorium oxide, drying the sol to form a gel and, thereafter, calcining the gel to form a high density thorium oxide. We have found, unexpectedly, that the incorporation of this small quantity of magnesium oxide in a thorium oxide and/or thorium-uranium oxide material substantially improves the dissolution properties of said material in an acid media. The addition of between about 0.5 and 1.6 weight percent magnesium oxide to this material results in a dissolution rate 3 to 5 times faster than obtainable when no magnesium oxide is present. At the same time, the addition of the magnesium oxide in these quantities does not significantly alter the irradiation or other physical properties of the fuel material and the improved dissolution properties are not materially affected by the irradiation. In order to obtain a composition having optimum dissolution properties, it is necessary to add the desired magnesium compound at a stage in the process when the thorium oxide is in a physical state that will provide for uniform dispersion of the magnesium. Maximum uniform dispersion is provided by adding the magnesium compound to a sol prepared from activated thorium oxide.

Activated thorium oxide is an impure nitrate-containing thorium oxide which is readily dispersible upon heating in water or in an aqueous nitrate system. While there are several well known methods for preparing activated thorium oxide, the preferred method is steam denitration of a thorium nitrate solution. The steam denitration process consists essentially of contacting a thorium nitrate solution or hydrated thorium nitrate with steam under controlled temperature conditions until the volatile nitrate and water content results in nitrate-containing thorium oxide that is free-flowing and readily dispersible. The steam denitration temperature is preferably maintained below about 475° C. The resulting activated thorium oxide product is a free-flowing powder with a residual nitrate concentration of about 0.03 mole per mole of $ThO_2$. This process for preparing activated thorium oxide is described in detail in Paper A/Conf/ 28/P/237, Third United Nations International Conference on the Peaceful Uses of Atomic Energy, 1964 and in Reactor Fuel Processing, 8(1):59(Winter 1964–1965).

The sol is prepared by dispersing the activated thorium oxide in an aqueous nitrate system by agitation and heating at a temperature of between about 80° C. and 100° C. for about 1 hour. The concentration of thorium oxide employed in sol preparation is not critical, and any concentration sufficiently low to allow complete dispersion may be used, e.g., 2 molar $ThO_2$. The pH of the system is not critical and pH values between 2.0 and 4.5 may be used; however, when uranium is added to the system, the pH must be more carefully controlled to assure uniform distribution of the uranium in the thoria sol.

Magnesium is added to the thoria sol in the form of a soluble or dispersible compound such as magnesium nitrate, magnesium chloride, magnesium bromide, magnesium perchlorate, or as magnesium oxide. Magnesium oxide may be added as a suspension of magnesium oxide particles. However, magnesium is preferably supplied in the form of a concentrated solution of magnesium nitrate, although the concentration of the solution is not critical. Magnesium is added to provide magnesium oxide in the calcined thoria composition in sufficient quantity to yield a significant increase in the dissolution rate. It has been found that some improvement in dissolution properties may result by the addition of as little as 0.5 weight percent MgO and that as much as 2 weight percent MgO may be used without undue interference with the irradiation properties of the thoria composition. However, a concentration of magnesium oxide in the thoria of between 0.7 and 1.0 weight percent is preferred and optimum dissolution results have been obtained with about 1.0 weight percent magnesia. The effect of the addition of various concentrations of MgO will be shown hereinafter in Examples I and II. The colloidal thoria sol containing dispersed magnesia is then slowly dried at a temperature of between approximately 50° C. to 100° C. to form vitreous gel fragments. The preferred drying temperature is approximately 80° C.

The vitreous gel obtained by drying the sol is converted to dense refractory oxide particle composition by calcining the thoria gel in air for about 1 hour at between about 950° C. and 1200° C. The preferred calcination procedure is to raise the temperature of the gel to approximately 1150° C. at a rate not exceeding approximately 300° C. per hour and calcining at 1150° C. for at least 3 hours. For the preparation of uranium bearing thorium oxide, calcination is conducted in a hydrogen atmosphere in order to reduce the uranium to a suitable oxide state.

A thorium oxide particle composition containing between about 0.5 and 1.6 weight percent magnesium oxide are obtained by this method with a particle size of between about 0.5 and 2 millimeter in diameter and a density of between about 93 and 99 percent of theoretical.

The effects of the incorporation of magnesium oxide into high-density thorium oxide is illustrated by the following specific examples and accompanying drawings:

*Example I*

Four 26.4 gram samples of −16+20 mesh (U.S. Sieve Series) high-density thorium oxide were each prepared by the sol-gel process having magnesium oxide in amounts indicated in the table below. The table also shows the final calcining temperature of the thorium oxide product.

| Sample | Magnesium Oxide | | Calcining Temp., ° C. |
|---|---|---|---|
| | Weight Percent | Added As— | |
| 1 | 0 | | 1,100 |
| 2 | 0.7 | MgO Slurry | 1,150 |
| 3 | 1.0 | do | 1,150 |
| 4 | 1.0 | $Mg(NO_3)_2$ Solution | 1,175 |

Magnesium added to the $ThO_2$ sol as nitrate is, of course, converted to oxide upon heating and calcining of the thorium oxide. The high density thorium oxide product samples were dissolved in an aqueous acid solvent comprising 100 ml. of 13 M $HNO_3$–0.025 M HF–0.10 M $Al(NO_3)_3$ at boiling temperatures and under conditions of good agitation to insure thorough contact between the samples and the solvent. The results of these dissolutions may be seen by reference to the accompanying FIGURE 1, wherein the percent of thorium dissolved is plotted against the dissolution time for the several samples having different quantities of magnesium oxide. It may be seen that the addition of only 0.7 weight percent magnesium oxide results in substantial improvement in the dissolution rate of the high density thorium oxide. More significantly, the thorium oxide containing 1.0 weight percent magnesium oxide was completely dissolved within one hour, both in the samples where magnesium was added to the thorium oxide sol in the form of oxide slurry and where added as nitrate. The sample with magnesium added as nitrate dissolved slightly more rapidly even though it was calcined at a slightly higher temperature than the other samples.

*Example II*

Three samples of −16+20 mesh high-density thorium oxide, each prepared by the sol-gel process, as in Example I, contained magnesium oxide in the amounts indicated in the table below. The final calcining temperature is also shown.

| Sample | Magnesium Oxide | | Calcining Temp., ° C. |
|---|---|---|---|
| | Weight Percent | Added As— | |
| 1 | 0 | | 1,050 |
| 2 | 1.0 | $Mg(NO_3)_2$ Solution | 1,050 |
| 3 | 1.6 | do | 1,050 |

These samples were dissolved in boiling aqueous acid solvent comprising 13 M $HNO_3$–0.025 M HF–0.10 M $Al(NO_3)_3$. Boiling temperature was used under conditions of good agitation to insure thorough contact between the samples and the solvent. The results of these dissolutions may be seen in the accompanying FIGURE 2, wherein the molarity of $Th^{+4}$ in solution is plotted against the dissolution time for the three samples. One molar $Th^{+4}$ equals 100% of the thorium dissolved. It will be seen that the sample containing 1.0 weight percent magnesium oxide dissolved much more rapidly than the sample without magnesium oxide. The sample containing 1.6 weight percent magnesium oxide also dissolved very rapidly, but provided no significant improvement over the 1.0 weight percent material, although the dissolution was substantially complete within about 1¼ hours.

Upon subsequent irradiation of thorium oxide samples containing 0.7 weight percent magnesium oxide calcined at 1100° C., it was found that the irradiation did not significantly affect the dissolution rate and that the magnesium oxide impurity did not interfere with the physical and irradiation properties of the material.

Although our invention is illustrated primarily with reference to the addition of magnesium oxide to high-density oxide fuel material during its preparation by the sol-gel process, it is to be understood that such an addition may be made in other processes for the preparation of reactor fuel material and numerous variations in apparatus and procedure may be employed by one skilled in the art without departing from the scope of our invention. The foregoing description and examples are not intended to restrict the scope of our invention and our invention should be construed as limited only to the extent indicated by the appended claims.

What we claim is:

1. An oxide particle composition having improved dissolution properties in nitric acid media consisting essentially of an oxide selected from the group consisting of thorium oxide and thorium-uranium oxide and between about 0.5 and 1.6 weight percent magnesium oxide, said magnesium oxide being intimately dispersed throughout said composition.

2. An improved nuclear reactor fuel material consisting essentially of thorium oxide together with magnesium oxide, said magnesium oxide being intimately dispersed throughout said material in the amount of between about 0.5 and 1.6 weight percent of said material to substantially improve the dissolution properties of said material in nitric acid media.

3. In a process for the preparation of oxide particles selected from the group consisting of thorium oxide and thorium-uranium oxide which includes the step of preparing an activated thorium oxide sol, the improvement which comprises incorporating into said sol a magnesium compound selected from the group consisting of magnesium oxide, magnesiuc nitrate, magnesium chloride, magnesium bromide, and magnesium perchlorate, said magnesium compound being incorporated in an amount equivalent to magnesium oxide of between about 0.5 and 1.6 weight percent of said composition; and, thereafter, drying said sol to form a gel, and calcining said gel to form a high-density oxide particle composition having improved dissolution properties in nitric acid media.

References Cited by the Examiner
UNITED STATES PATENTS

| | | | |
|---|---|---|---|
| 1,645,599 | 10/1927 | Jones | 252—301.1 |
| 2,938,839 | 5/1960 | Fahnoe et al. | |
| 3,081,249 | 3/1963 | Whittemore | 264 |

CARL D. QUARFORTH, *Primary Examiner.*

BENJAMIN R. PADGETT, *Examiner.*

L. A. SEBASTIAN, *Assistant Examiner.*